US009648202B2

(12) United States Patent
Bergstrand

(10) Patent No.: US 9,648,202 B2
(45) Date of Patent: May 9, 2017

(54) TRANSMITTING A JOB TO A DESTINATION USING A DESTINATION NOTIFICATION MANAGER AND A DELIVERY AGENT

(71) Applicant: Hewlett-Packard Development Company, L.P., Houston, TX (US)

(72) Inventor: John Troy Bergstrand, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/200,085

(22) Filed: Jul. 1, 2016

(65) Prior Publication Data
US 2016/0316101 A1 Oct. 27, 2016

Related U.S. Application Data

(62) Division of application No. 14/373,176, filed on Jul. 18, 2014, now Pat. No. 9,413,924.

(51) Int. Cl.
H04N 1/00 (2006.01)
H04N 1/32 (2006.01)

(52) U.S. Cl.
CPC ..... *H04N 1/32523* (2013.01); *H04N 1/00411* (2013.01); *H04N 2201/0094* (2013.01)

(58) Field of Classification Search
CPC ........... H04N 1/32523; H04N 1/32518; H04N 1/32534; H04N 1/00244; H04N 1/32101; H04N 1/00405
USPC ...................................................... 358/1.15
See application file for complete search history.

(56) References Cited

U.S. PATENT DOCUMENTS

| 5,870,089 | A | 2/1999 | Fabbio |
| 7,161,697 | B2 | 1/2007 | Yajima |
| 7,281,049 | B2 | 10/2007 | Verma et al. |
| 8,014,025 | B2 | 9/2011 | Steele et al. |
| 8,127,306 | B2 | 2/2012 | Regnier et al. |
| 2002/0138579 | A1* | 9/2002 | Goldberg ............ G06Q 10/107 709/206 |
| 2003/0093525 | A1 | 5/2003 | Yeung |
| 2003/0184783 | A1 | 10/2003 | Shahindoust et al. |
| 2005/0134875 | A1 | 6/2005 | Currans et al. |

(Continued)

FOREIGN PATENT DOCUMENTS

CN 101176337 A 5/2008

OTHER PUBLICATIONS

Bloggingtips.com, Kwan, M., "Use LinkShiftr for Multiple Destinations with One Shortened URL," May 5, 2011, found at http://www.bloggingtips.com ~ 4 pages.

(Continued)

*Primary Examiner* — Eric A Rust
(74) *Attorney, Agent, or Firm* — HP Inc. Patent Department

(57) ABSTRACT

Examples disclosed herein relate to processors instructed to receive a job from a job source, retrieve destinations from a destination store and present the destinations on a user interface, receive through the user interface, a selected destination and parameters for the job, map the selected destination to a delivery agent, render the job into a document, and transmit the document to the selected destination with the delivery agent.

15 Claims, 6 Drawing Sheets

(56) References Cited

U.S. PATENT DOCUMENTS

| | | | | |
|---|---|---|---|---|
| 2006/0012833 A1* | 1/2006 | Ito | ............... | H04N 1/00209 |
| | | | | 358/400 |
| 2006/0209867 A1* | 9/2006 | Schmidt | ............... | H04L 12/587 |
| | | | | 370/428 |
| 2006/0227367 A1* | 10/2006 | Kitada | ............... | G06F 11/2028 |
| | | | | 358/1.15 |
| 2007/0121147 A1 | 5/2007 | Corona et al. | | |
| 2008/0198986 A1* | 8/2008 | Tonegawa | ........... | H04L 65/1069 |
| | | | | 379/100.17 |
| 2009/0059271 A1 | 3/2009 | Henry et al. | | |
| 2009/0135446 A1 | 5/2009 | Kawabuchi et al. | | |
| 2009/0282412 A1 | 11/2009 | Sekine | | |
| 2011/0153760 A1* | 6/2011 | Fan | ............... | G06Q 10/107 |
| | | | | 709/206 |

OTHER PUBLICATIONS

George Mikolay, "Services 'The Buzz' at Ricoh's Dealer Show. Host of New Products Announced," Jun. 6, 2011, Buyer's Lab, New Articles ~ 2 pages.

Ricoh, "Sending received fax documents or scanned files to a shared folder directly," May 17, 2009, (web page), <http://support.ricoh.com, 1 page.

Brother Industries, Ltd., "Scan," Jan. 10, 2012, LearningCenter, (web page), http://web.archive.org~5 pages.

\* cited by examiner

TRANSMITTING A JOB TO A DESTINATION USING A DESTINATION NOTIFICATION MANAGER AND A DELIVERY AGENT

BACKGROUND

Many of today's print/scan/copy/fax devices, also called multi-function printers, enable the transmission of document jobs from different job sources to various document destinations. For example, some all-in-one devices include a number of "scan-to" functions that allow a user to scan a document to destinations such as a desktop share folder, a printer, a network share folder, a user account on a social networking web server, a memory or mass storage device, an email server, into an email on a PC, and so on. Currently, to enable the transmission of documents in this manner, a distinct software service is implemented for each combination of job source and document destination. For example, transmitting a job from a scanner (i.e., a job source) to a desktop share folder i.e., a document destination) would be managed by a first software service, while transmitting the same job from the scanner to an email server would be managed by a second, distinct, software service.

BRIEF DESCRIPTION OF THE DRAWINGS

The present embodiments will now be described, by way of example, with reference to the accompanying drawings, in which.

DETAILED DESCRIPTION

Overview

Figure 1:
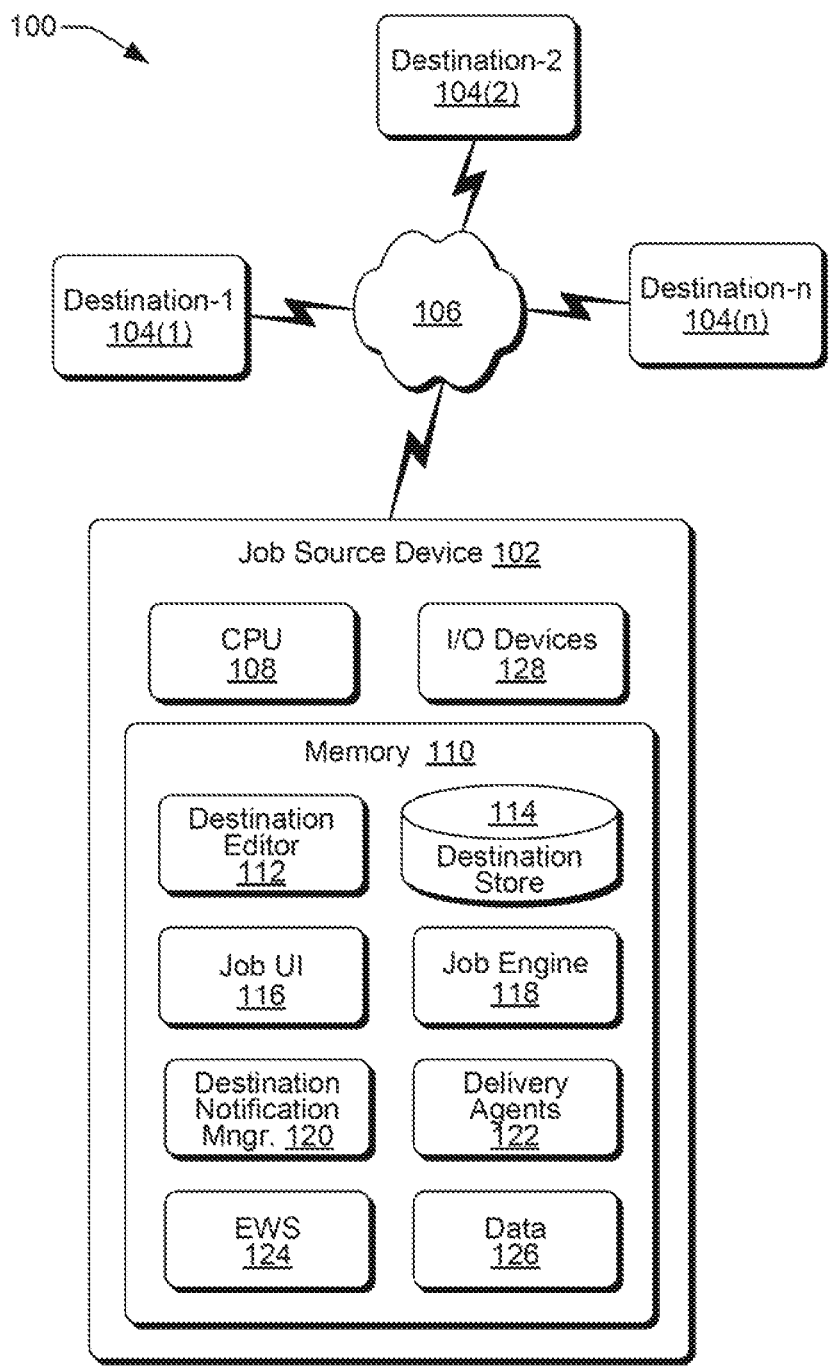
FIG. 1 shows an exemplary environment suitable for implementing a destinations web service, according to an embodiment.

As generally noted above, current all-in-one devices support the transmission of jobs between job sources and document destinations through the use of distinct services that are specific to each different combination of job type and destination type. For example, a service implemented in a fax-to-network-folder operation is different than a service implemented in a scan-to-network-folder operation. Thus, an all-in-one device having N different sources of job types (e.g., a scanner, a fax, a mass-media/flash-drive plug-in port etc.) from which a user may want to transmit jobs to M different destinations (e.g., network folder, desktop share folder, Facebook user account, etc.), would involve as many as N times M distinct services. Each of these services is resident on the all-in-one device and each typically involves a separate setup process by a user. As the number and variety of destination types continues to increase (e.g., media applications, social networking sites), the resources needed to manage the associated services on such devices will increase considerably.

Embodiments of the present disclosure, however, provide a dynamically extensible destination service that enables the use of all destination types with all job types through a uniform interface. A "destinations web service" facilitates the creation and management of destinations to which a print, fax, scan or other job type may be sent, and manages delivery agent applications that transmit the job to the destination. Therefore, devices are not limited to transmitting jobs to destinations resident within their firmware when the devices are shipped. Instead, the number and types of destinations to which users can transmit jobs can be continually and dynamically expanded without firmware upgrades.

A destination editor is used to create and manage stored destinations. The editor creates a new destination by collecting destination specific information, such as the "To" and "Cc" addresses and "Subject" of an email destination. This information may be used as a one-shot destination for the current job, or be saved in a destination store with a name with which it may be selected for any number of later jobs. The editor may list existing destinations that can be elected for editing or be deleted.

A user-selected destination is passed as a job parameter within the job to the device engine which generates a document (or file) from the job. The device passes the selected destination to a "destination notifications manager" which matches the selected destination with a destination delivery agent that has previously registered with the notifications manager. Each delivery agent registers with the destinations notifications manager, and delivery agents may be resident in the device or run remotely. The delivery agent is notified of the selected destination and is passed context data stored within the destination (e.g., email address, user account, password, etc.). The delivery agent is also passed a reference that identifies the document/file (i.e. generated from the job) to be transmitted to the selected destination. The delivery agent retrieves the document and executes an appropriate destination-specific protocol to deliver it to the selected destination (e.g., SMTP (email), FTP, SMB (shared desktop folder), etc.).

In one example embodiment, a processor-readable medium stores code representing instructions that when executed by a processor cause the processor to receive a selected destination to which to send a job of a particular type. The instructions further cause the processor to pass the job with the selected destination as a job parameter, to a job engine whose function matches the particular job type. The processor matches the selected destination with a specific delivery agent that supports destination data associated with the selected destination, and that is registered to receive a notification of the selected destination. The destination data and a document reference identifying the document generated from the job by the job engine, are passed to the delivery agent. Using the document reference and the destination data, the delivery agent retrieves the document and transmits the document to the selected destination.

In another example embodiment, a job source device includes one or more job sources, and a destination editor that enables a user to create destinations for jobs. The device includes an extensible destination store to store the destinations. The device also includes a job U/I that allows a user to initiate a job and enter job parameter data. When a user initiates a job, the job U/I retrieves the destinations from the extensible destination store, presents the destinations, and submits a user-selected destination to a destination notification manager. The destination notification manager maps the user-selected destination to a delivery agent, and the delivery agent transmits the job to the user-selected destination.

In another example embodiment, a processor-readable medium stores code representing instructions that when executed by a processor cause the processor to receive a job from a job source. The processor retrieves destinations from a destination store and presents the destinations on a job U/I. The processor receives a user-selected destination and parameters for the job through the job U/I, and maps the selected destination to a delivery agent. The job is rendered into a document which the delivery agent transmits to the selected destination.

ILLUSTRATIVE EMBODIMENTS

FIG. 1 shows an exemplary environment 100 suitable for implementing a destinations web service as generally disclosed herein, according to an embodiment of the disclosure. Environment 100 includes a job source device 102. In some implementation, job source device 102 comprises an all-in-one (AIO) device, or multi-function printer (MFP) device that includes functions such as printing, scanning, facsimile and copy functions to generate print jobs, scan jobs, fax job and copy jobs, respectively. While job source device 102 is generally represented throughout this description as an all-in-one device 102, in other embodiments job source device 102 may be implemented as a single function device such as a standalone scanner, a fax machine, a printer, or as something more abstract such as an operating system supporting a file system running on computer or on any of the aforementioned physical devices. In general, job source device 102 should be capable of holding and/or generating a document that is to be transmitted to some destination. In addition, the device 102 may host any or all of the components of the destinations web service. In the FIG. 1 implementation, all of the various components of the destinations web service are resident on job source device 102. In other implementations as discussed below, different components of the service may reside on devices other than the job source device 102.

The job source device 102 is coupled to one or more destinations 104(1-n) through network 106. Network 106 is intended to represent any of a variety of conventional network topologies and types (including optical, wired and/or wireless networks), employing any of a variety of conventional network protocols (including public and/or proprietary protocols). Network 106 may include, for example, a corporate network, a home network (e.g., a cable), or the Internet, as well a one or more local area networks (LANs) and/or wide area networks (WANs), and combinations thereof.

A destination 104 is intended to represent any of a wide variety of devices and/or applications running on devices that are capable of receiving a document or file from a job such as a print job, scan job, fax job or other type of job. For example, a destination 104 can include a desktop share folder, a printer, a network share folder, a user account on a social networking web server, an email server, an FTP site, the memory of a PC or server, a mobile mass-storage device such as a USB flash memory drive (e.g., inserted into a USB port of a PC, printer, or other device), and so on.

A job source device 102 (e.g., an all-in-one device) generally includes standard computing components such as a processor (CPU) 108 and a memory 110 (e.g., volatile and non-volatile memory components). Memory 110 comprises processor/computer-readable media that provides for the storage of processor/computer-executable instructions in the form of various firmware, software, applications, modules, and so on. As noted above, in the embodiment of FIG. 1, all of the components of the destination web service reside on the job source device 102. These components generally reside in memory 110, and include a destination editor 112, an extensible destination store 114, a job U/I 116, a job engine 118, a destination notification manager 120, and one or more delivery agents 122. There may also be other applications stored in memory 110, such as an embedded web server (EWS) 124. Memory 110 may also store various types of data and data structures, such as a print job or a file to be printed. Thus, data 126 can include print job commands and/or command parameters. Job source device 102 also typically includes various input/output devices 128 such as a front panel, a keyboard, a touch-screen, a USB port, and so on.

The components of the destination web service generally work together to enable the creation and management of all types of destinations, and the use of the destinations by all types of jobs. Destination editor 112 is any application executable by a processor 108 to create, edit and/or delete destinations 104. The destination editor 112 provides a U/I through which a user can enter the name and, optionally, a description of a destination 104, as well as destination data used by the delivery agent 122 (e.g., in XML, JSON, etc.). The destination editor 112 also knows and associates the destination 104 with a unique identifier (i.e., globally unique identifier, GUID) of the destination delivery agent 122. In some implementations, the destination editor 112 retrieves a list of currently registered destination delivery agents 122 so the U/I it presents supports those destinations 104 for which there is a registered destination delivery agent 122. For example, a destination editor 112 creating a social networking account destination (e.g., a Facebook account destination), knows the delivery agent identification and the XML format for the account name and password. The editor 112 presents the U/I to collect and verify the account name and password before saving the data as a destination 104 in the extensible destination store 114 on job source device 102. The destination editor 112 can run on the host device 102 through a front panel or EWS 124, on a remote front panel, or on a remote device such as a mobile phone or tablet, as discussed below.

The extensible destination store 114 holds the destinations 104 created by users through a destination editor 112. There is no minimum or maximum size of the store 114, and it is limited only by the resources available on the implementing host device 102. The destination store 114 is typically located on the host job source device 102, but in some implementations it may also be located off the device 102 on a remote device, as discussed below. While the destination store 114 can include one or more destinations 104 preloaded into firmware, the store 114 is dynamically extensible through the destination editor 112. Thus, as new destinations 104 develop after a job source device 102 ships to a user (e.g., new social networking accounts, new email address destinations, etc.), firmware upgrades are not needed to add the new destinations to the store 114. Instead, the list of available destinations 104 can be extended by the user to include new destinations through the destination editor 112, and by the registration of associated delivery agents 122 with the destination notification manager 120 as discussed below.

The job U/I 116 allows user to initiate a job and enter job parameter data. When a user initiates a job, the job U/I 116 retrieves the destinations 104 available to the user from the destinations store 114 and presents them to the user for selection along with the rest of the job parameters. The job U/I 116 passes the selected destination as a job parameter to the job engine 118 to create a new document, and the job engine 118 communicates the user-selected destination to the destination notification manager 120. The job U/I may be implemented on the host device 102 in the front panel or EWS 124, or on a remote device.

The job engine 118 is the engine that matches the job type being initiated at the time. The job engine 118 can be, for example, the scan engine, the print engine, the fax engine, the copy engine, and so on. The job engine 118 processes the job to generate the document that will be transmitted to the destination. The job engine 118 passes a reference to the document and the user-selected destinations to the destination notification manager 120. Thus, when a user initiates a scan job, the job engine 118 to which the selected destination is passed, is the scan engine of the job source device 102.

The destination notification manager 120 notifies the appropriate destination delivery agent 122 that one of its destinations 104 has been selected in order to initiate the document transmission process. The destination notification manager 120 maps the selected destination to the appropriate destination delivery agent 122, and passes the destination delivery agent 122 specific data that is stored within the selected destination. The delivery agent 122 then transmits the document to its ultimate destination using the destination-specific data. The selected destination is mapped to the appropriate delivery agent 122 using the delivery agent's unique identifier (i.e., GUID) and a registration system implemented within the destination notification manager 120. Each delivery agent 122 registers itself with the destination notification manager 120 using its GUID. Once registered, a delivery agent 122 receives notifications from the destination notification manager 120 whenever a destination associated with its GUID has been selected. Like the destinations store 114 the destination notifications manager 120 is typically implemented on the host device 102, but in some embodiments may be implemented on a remote device, as noted below.

Destination delivery agents 122 implement the appropriate protocols specific to the particular destinations to which documents are being transferred. Each delivery agent 122 has a unique identifier (GUID), and each supports a unique set of destination data. For example, the delivery agent 122 for a social networking account destination (e.g., a Facebook account destination), would typically support a set of destination data that includes a URL, an account name and a password to the user's account. As noted above, each destination delivery agent 122 registers itself with the destination notifications manager 120 to receive notifications of selected destinations. The destination notifications manager 120 passes the destination delivery agent the destination-specific data stored within the selected destination enabling the delivery agent to execute the destination-specific protocol for transmitting the document to the selected destination. Like the destinations store 114, a destination delivery agent 122 may reside on the host job source device 102 or on a remote device, so long as the delivery agent 122 is able to register for and respond to notifications.

Figure 2:
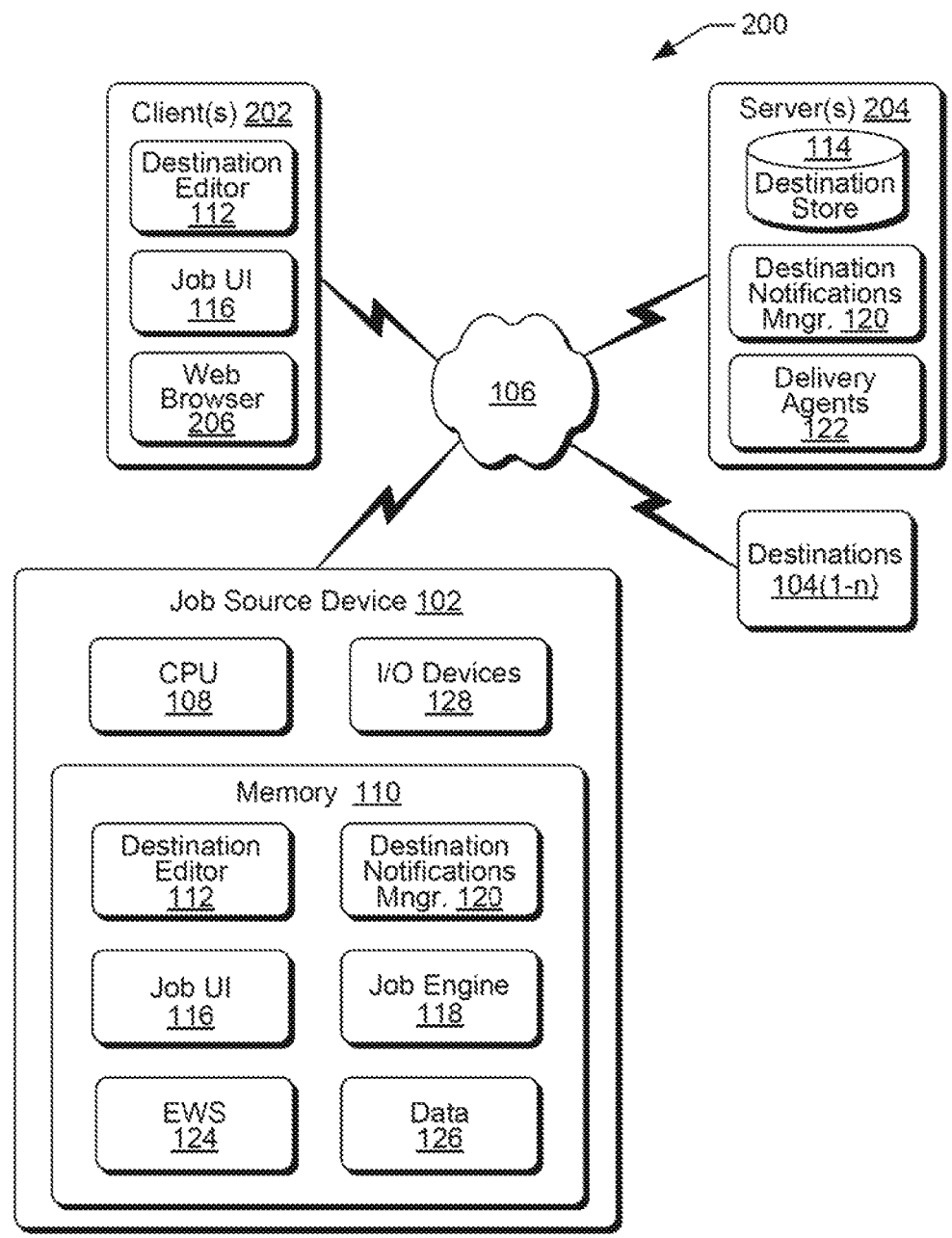
FIG. 2 shows another exemplary environment suitable for implementing a destinations web service, according to an embodiment.

FIG. 2 shows another exemplary environment 200 suitable for implementing a destinations web service as generally disclosed herein, according to an embodiment of the disclosure. In this embodiment, while the components of the destinations web service function in the same general manner as discussed above regarding the FIG. 1 embodiment, the components do not all reside on the job source device 102. Instead, different components of the destinations web service can reside and function on devices that are remote from the job source device 102.

Accordingly, in addition to the job source device 102 and the destinations 104(1-*n*), environment 200 includes one or more remote clients 202 and one or more remote servers 204 coupled to the job source device 102 through a network 108. A remote client device 202 can be implemented, for example, as a desktop PC, a mobile computer, a mobile smart phone, a tablet computer, etc., hosting one or more destination web service components. Therefore, although not illustrated, remote clients 202 generally include one or more processors and memory components comprising processor/computer-readable media providing storage for processor/computer-executable instructions in the form of various firmware, software, applications, modules, and so on. For example, a remote client 202 may host and implement components such as a destination editor 112, a job U/I 116, and one or more destination delivery agents 112. As noted above, a destination editor 112 enables a user to create, manage and edit destinations in an extensible destination store 114, while the job U/I 116 retrieves and presents the destinations 104 to the user and allows the user to initiate a job and enter job parameter data. In another implementation, a user can initiate a web browser 206 on the remote client 202, and can use the browser 206 to access and implement a destination editor 112 and job U/I 116 on the job source device 102 through the embedded web server (EWS) 124 on the device 102.

A remote server 204 is typically implemented as any of a variety of web servers, workstations, desktop PCs, print servers, printers, combinations thereof, and so on. A remote server 204 generally includes a processor and memory components (not shown) comprising processor/computer-readable media that provides for the storage of processor/computer-executable instructions in the form of various firmware, software applications, modules, and so on. A remote server 204 may host and implement components such as a destination store 114, a destination notification manager 120, and one or more destination delivery agents 112.

Although a remote client 202 and remote server 204 have been generally described, there is no intent to limit these devices or the components they host. For example, a client 202 may in some embodiments comprise a web server and implement a shared destination store 114, while a remote server 204 may in some implementations comprise a mobile smart phone that implements a destination editor 112. The particular implementation and function of a remote chant 202 and remote server 204 in a given instance may depend upon specific circumstances of their use.

While some components of the destinations web service reside on devices that are remote from the job source device 102, other components of the service still reside on device 102. In addition, some components are duplicated between device 102 and remote client 202 and server 204. In general, there are many possible combinations and/or distributions of the destinations web service components across networked devices such as device 102, and a remote client 202 and server 204. Although every possible combination and/or distribution of the destination web services components is not illustrated, they are contemplated herein and included within the scope of this disclosure. There are various potential benefits to different component distributions across these remote devices. For example, where the destination editor 112 and job U/I 116 run on a remote client 202 (or remote front panel on client 202), a user can create and store destinations 104 while working from a PC desktop, and initiate jobs on the job source device 102 that can be transmitted to previous or newly created destinations.

In an enterprise, shared destination store 114 saved on a remote server 204 provides access for users across the enterprise to a broad set of destinations created by numerous users. A shared destination store 114 also reduces the need to have separate destination stores 114 on every device 102 across the enterprise. This significantly reduces the resources needed to implement the destination store 114. A shared destination store 114 also enables system administrators to maintain and control destinations at a single shared location. Similar benefits are achieved when the destination notification manager 120 is shared at a location remote from device 102, such as on a remote server 204. In one specific example, an enterprise policy may dictate that a first group of devices 102 in the enterprise be able to transmit jobs to a specific list of known destinations, while a second group of devices 102 in the enterprise be able to transmit jobs to an unlimited or expandable list of destinations. In such circumstances, causing the first group of devices 102 to use a shared destination notification manager 120 that has registered only the delivery agents 122 associated with the specific list of known destinations will limit the first group of devices 102 to transmitting jobs to the known destinations.

Figure 3:
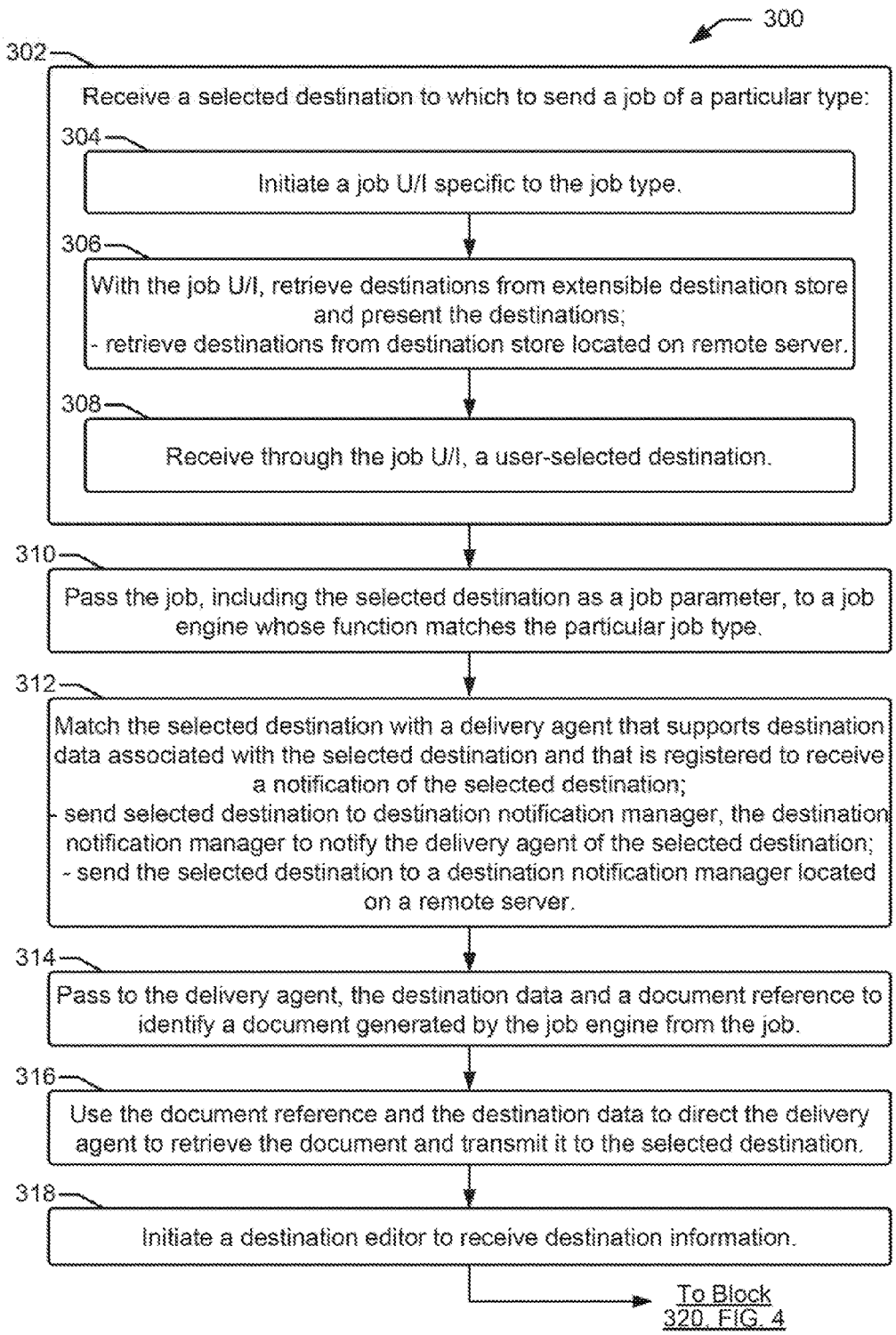
FIGS. 3-6 show flowcharts of example methods of transmitting a job to a destination according to embodiments.
Figure 4:
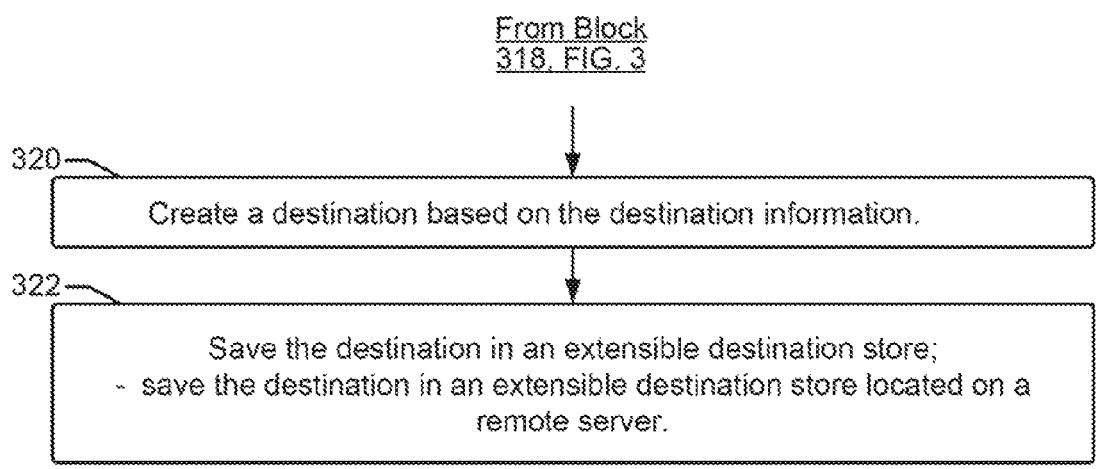
Figure 5:
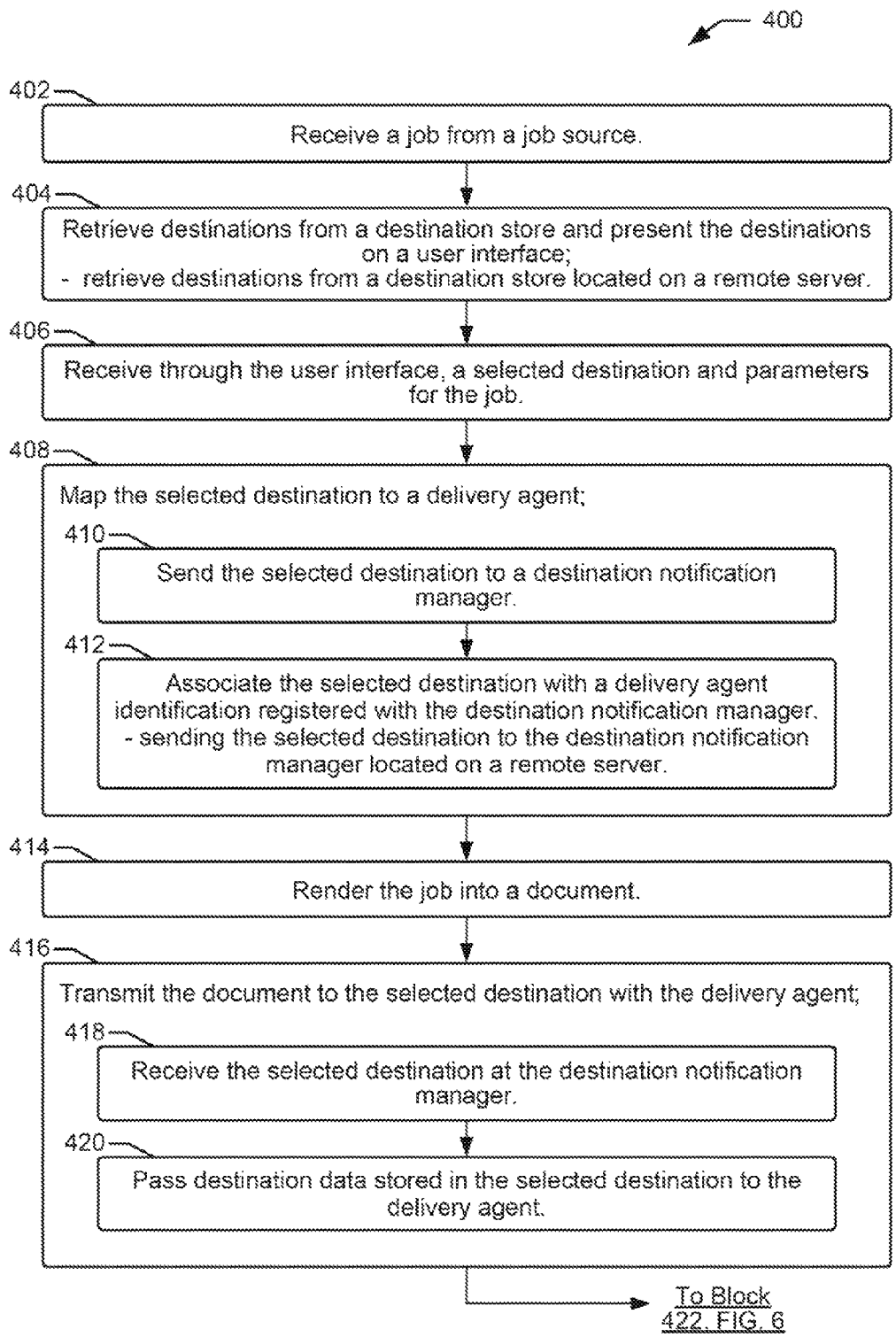

FIGS. 3-5 show flow charts of example methods 300 and 400, of transmitting a job to a destination, according to embodiments of the disclosure. Methods 300 and 400 are associated with the embodiments discussed above with regard to FIGS. 1-2, and details of the steps shown in methods 300 and 400 can be found in the related discussion of such embodiments. The steps of methods 300 and 400 may be embodied as programming instructions stored on a computer/processor-readable medium, such as memory 110 of FIGS. 1 and 2. In an embodiment, the implementation of the steps of methods 300 and 400 are achieved by the reading and execution of such programming instructions by a processor, such as processor 108 of FIGS. 1 and 2. Methods 300 and 400 may include more than one implementation, and different implementations of methods 300 and 400 may not employ every step presented in the respective flowcharts. Therefore, while steps of methods 300 and 400 are presented in a particular order within their respective flowcharts, the order of their presentation is not intended to be a limitation as to the order in which the steps may actually be implemented, or as to whether all of the steps may be implemented. For example, one implementation of method 300 might be achieved through the performance of a number of initial steps, without performing one or more subsequent steps, while another implementation of method 300 might be achieved through the performance of all of the steps.

Method 300 of FIG. 3 begins at block 302, with receiving a selected destination to which to send a job of a particular type. At blocks 304, 306 and 308, respectively, receiving the selected destination includes initiating a job U/I specific to the job type, retrieving destinations from an extensible destination store and presenting the destinations with the job U/I, and receiving a user selected destination through the job U/I. At block 306, retrieving destinations from an extensible destination store can include retrieving destinations from an extensible destination store located on a remote server or other remote device.

The method 300 continues at block 310 with passing the job, including the selected destination as a job parameter, to a job engine whose function matches the particular job type. For example, if the job type is a scan job, the job is passed to the scan engine of the device 102. At block 312 the selected destination is matched with a delivery agent that supports destination data associated with the selected destination and that is registered (with the destination notification manager) to receive a notification of the selected destination. Matching the selected destination with the delivery agent includes sending the selected destination to the destination notification manager, and notifying the delivery agent of the selected destination with the destination notification manager. In some implementations, sending the selected destination can include sending the selected destination to a destination notification manager located on a remote server or other remote device.

At block 314 of method 300, the destination data and a document reference to identify a document generated by the job engine from the job, are passed to the delivery agent. At block 316 the document reference and the destination data are used to direct the delivery agent to retrieve the document and transmit it to the selected destination.

At block 318 of method 300, a destination editor is initiated to receive destination information. The method 300 then continues in FIG. 4 at block 320, with creating a destination based on the destination information. At block 322 of method 300, the destination is saved in an extensible destination store. Saving the destination in an extensible destination store can include saving the destination in an extensible destination store located on a remote server or some other remote device.

Method 400 is another method of transmitting a job to a destination. Method 400 begins at block 402 of FIG. 5, with receiving a job from a job source, such as a scanner, a flash drive, or a fax engine. At block 404 of method 400, destinations are retrieved from a destination store and presented on a user interface. In some implementations the destinations are retrieved from a destination store located on a remote server or other remote device. At block 406, a user-selected destination and parameters for the job are received through the user interface.

The method 400 continues at block 408, where the selected destination is mapped to a destination delivery agent. Mapping the selected destination to a delivery agent includes sending the selected destination to a destination notification manager (block 410), and associating the selected destination with a delivery went identification that is registered with the destination notification manager (block 412). In some implementations, sending the selected destination to a destination notification manager includes sending the selected destination to the destination notification manager located on a remote server or some other remote device.

At block 414 of method 400, the job is rendered as a document, or file. At block 416, the document or file is transmitted to the selected destination using the delivery agent. Transmitting the document to the selected destination includes receiving the selected destination at the destination notification manager (block 418) and passing destination data stored in the selected destination to the delivery agent (block 420). In some implementations, the delivery agent can be located on a remote server or other remote device.

Figure 6:
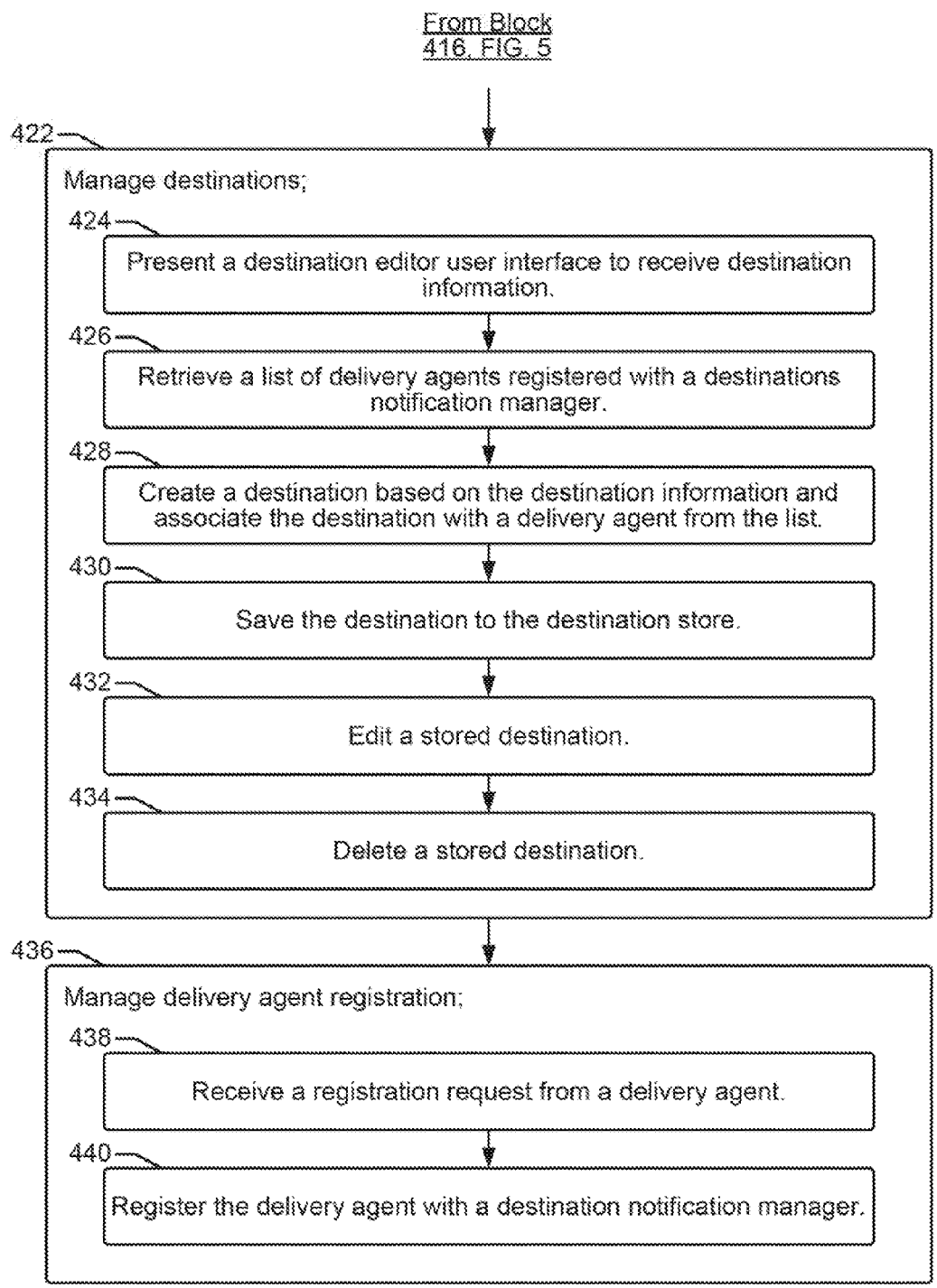

The method then continues in FIG. 6, at block 422, with managing destinations to which jobs may be sent. Managing destinations includes presenting a destination editor user interface to receive destination information, as shown at block 424. Managing destinations also includes receiving a list of delivery agents that are registered with a destinations notification manager (block 426), and creating a destination based on the destination information and the destination that is associated with a delivery agent from the list (block 428). Then, as shown at block 430, the destination is saved to the extensible destination store. Managing destinations also enables editing previously stored destinations and deleting destinations, as shown at blocks 432 and 434, respectively.

Method 400 can continue at block 436, with managing the registration of destination delivery agents. Managing delivery agent registration includes receiving a registration request from a delivery agent, as shown at block 438. Upon receiving the registration request the delivery agent is registered with a destination notification manager, as shown at block 440.

What is claimed is:

1. An apparatus comprising:
   a plurality of job sources;
   a destination editor to enable a user to create destinations for jobs;
   an extensible destination store to store the destinations;
   a job user interface to retrieve the destinations from the store, present the destinations, and submit a user-selected destination to a destination notification manager;
   the destination notification manager to:
     map the user-selected destination to a delivery agent,
     transmit a notification to the delivery agent that the user-selected destination is associated with a previously registered globally unique identification of the delivery agent, and
     transmit destination specific data associated with a job and a reference to a document generated from the job to the delivery agent; and
   the delivery agent to retrieve the document based on the reference and to transmit the document to the user-selected destination.

2. The apparatus of claim 1 wherein the job source device comprises an all-in-one device.

3. The apparatus of claim 2, wherein the plurality of job sources are selected from the group of sources comprising a copy engine, a scan engine, a facsimile engine, a mass-media storage engine and a print engine.

4. The apparatus of claim 1, wherein the job is selected from the group comprising a copy job, a scan job, a fax job, a mass-media job and a print job.

5. The apparatus of claim 1, wherein the destination notification manager is located on a remote server.

6. The apparatus of claim 1, wherein the destination editor is further configured to save a new destination to the extensible destination store without a firmware update to the job source.

7. The apparatus of claim 1, wherein the notification to the delivery agent is transmitted before the destination specific data associated with the job and the reference to the document generated from the job.

8. A non-transitory processor-readable medium storing code representing instructions that when executed by a processor cause the processor to:
   receive a job from a job source;
   retrieve destinations from a destination store and present the destinations on a user interface;
   receive through the user interface, a user-selected destination and parameters for the job;
   map the user-selected destination to a delivery agent;
   render the job into a document;
   transmit a notification to the delivery agent that the user-selected destination is associated with a previously registered globally unique identification of the delivery agent,
   transmit destination specific data associated with the job and a reference to the document to the delivery agent; and
   retrieve the document based on the reference and transmit the document to the user-selected destination with the delivery agent.

9. A non-transitory processor-readable medium as in claim 8, wherein to retrieve destinations from the destination store comprises retrieving destinations from a destination store located on a remote server.

10. A non-transitory processor-readable medium as in claim 8, wherein instructions causing the processor to map the selected destination to the delivery agent, further cause the processor to:
    send the selected destination to a destination notification manager; and
    associate the selected destination with the previously registered globally unique identification of the delivery agent previously registered with the destination notification manager.

11. A non-transitory processor-readable medium as in claim 10, wherein to send the selected destination to the destination notification manager comprises sending the selected destination to a destination notification manager located on a remote server.

12. A non-transitory processor-readable medium as in claim 11, wherein instructions causing the processor to transmit the document to the user-selected destination with the delivery agent, further cause the processor to:
    receive the user-selected destination at the destination notification manager; and
    transmit the destination specific data stored in the selected destination to the delivery agent.

13. A non-transitory processor-readable medium as in claim 8, wherein the instructions further cause the processor to:
    present a destination editor user interface to receive destination information;
    retrieve a list of delivery agents registered with a destinations notification manager;
    create a destination based on the destination information and associate the destination with a delivery agent from the list; and
    save the destination to the destination store.

14. A non-transitory processor-readable medium as in claim 13, wherein the instructions further cause the processor to:
    edit a previously stored destination through the destination editor; and
    delete a previously stored destination through the destination editor.

15. A non-transitory processor-readable medium as in claim 8, wherein the instructions further cause the processor to:
    receive a registration request from the delivery agent; and
    register the delivery agent with a destination notification manager.

* * * * *